April 2, 1957  M. VAN TOL  2,787,710
CIRCUIT-ARRANGEMENT FOR ELECTRICALLY MEASURING
OR REGULATING A VARIABLE FACTOR
Filed March 3, 1954  2 Sheets-Sheet 1

INVENTOR.
MARTINUS VAN TOL
BY
Fred M. Vogel
AGENT.

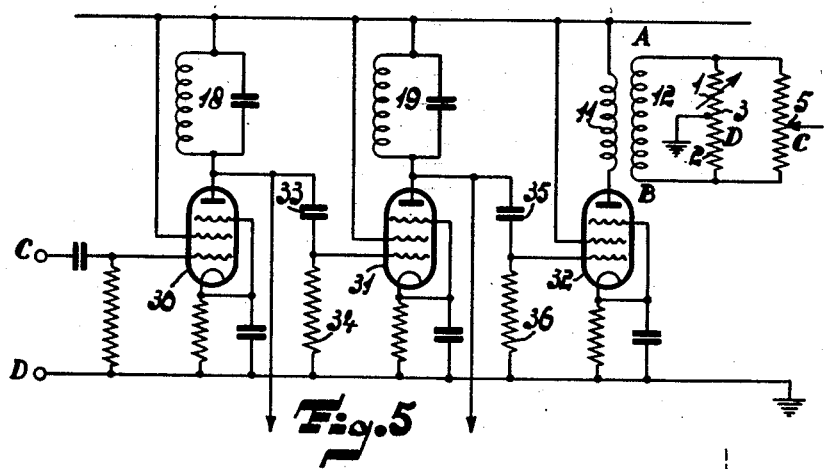
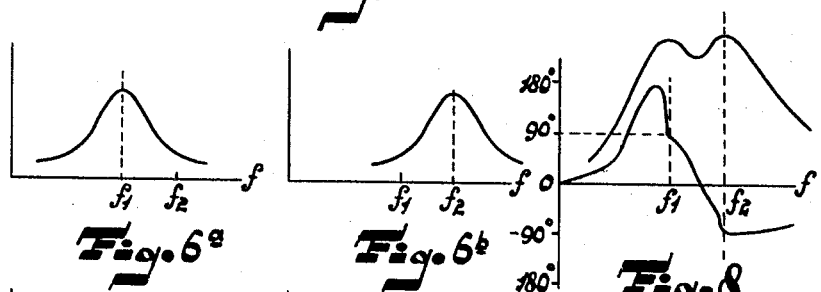
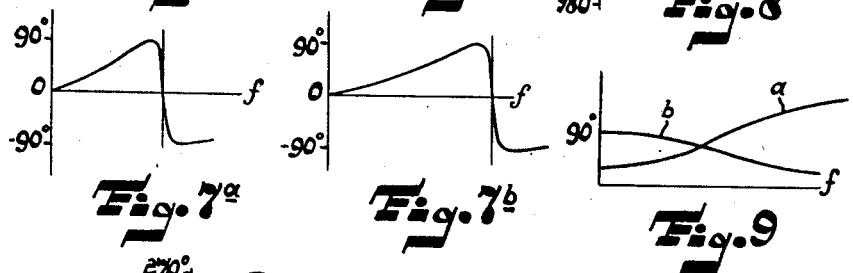
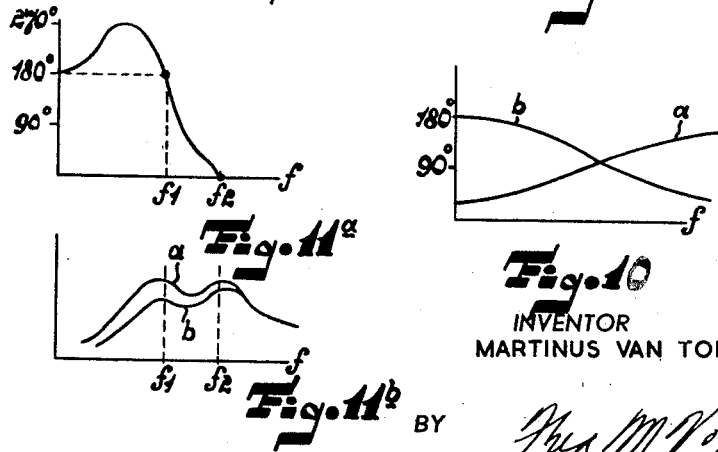
INVENTOR
MARTINUS VAN TOL
BY
AGENT

| United States Patent Office | 2,787,710
Patented Apr. 2, 1957 |
|---|---|

2,787,710

CIRCUIT-ARRANGEMENT FOR ELECTRICALLY MEASURING OR REGULATING A VARIABLE FACTOR

Martinus van Tol, Eindhoven, Netherlands, assignor, by mesne assignments, to North American Philips Company, Inc., New York, N. Y., a corporation of Delaware Application March 3, 1954, Serial No. 413,886

Claims priority, application Netherlands March 4, 1953

6 Claims. (Cl. 250—36)

This invention relates to circuit-arrangements for electrically measuring or regulating a variable factor.

Regulating devices are known with which a voltage derived from a factor to be measured, for example a temperature, is supplied to an amplifier whose output voltage is caused to operate a regulating member, for example one or more relays or an electric motor such that, upon the factor deviating from a given desired value, the regulating member becomes operative and entirely or partly neutralizes the initial deviation.

Similarly, a record of a variable factor is obtainable. To this end one may proceed as shown in Fig. 1.

Figure 1:
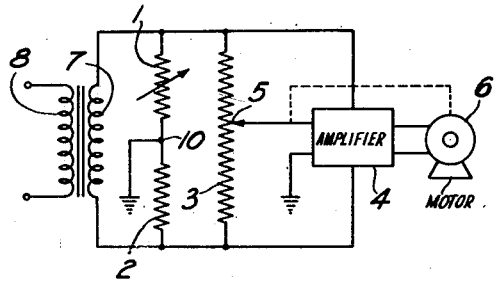

The circuit-arrangement shown in Fig. 1 comprises a bridge including three resistors 1, 2 and 3, the first of which is variable and depends upon the factor to be recorded. If, for example, said factor is a temperature prevailing in a chamber, the resistor 1 may have a comparatively high temperature coefficient provided in or adjacent said chamber. The second resistor 2 has a fixed value and the third resistor 3 is a potentiometer with a sliding contact 5.

The bridge may be supplied with direct voltage. Preferably, however, it is supplied with alternating voltage, as depicted in Fig. 1. To this end one diagonal is connected to a secondary winding 7 of a transformer whose primary 8 is connected to the source of supply voltage. The bridge diagonal between the sliding contact 5 and a common point 10 of the resistors 1 and 2 is connected to the input circuit of an amplifier 4 which may comprise one or more amplifying tubes and may be combined with a rectifier whose output voltage controls a device causing a motor 6 to operate in one direction or in the other in accordance with the phase of the output voltage. The motor shaft is connected to the sliding contact 5 through a gear system as indicated by the broken lines in Fig. 1.

When the value of the resistor 1 changes due to a variation of the temperature to be recorded so that the equilibrium of the bridge is destroyed, a voltage is set up in the input circuit of the amplifier 4. As a result of the amplified voltage the motor 6 is operated. In the case of A. C. supply voltage the amplifier should comprise means for making the polarity of the output voltage dependent upon the phase of the input voltage. Therefore, the amplifier 4 must moreover be supplied with a voltage from the A. C. voltage supply source. The motor 6 shifts the sliding contact 5 of the potentiometer in such a sense as to restore equilibrium of the bridge. In this case there is no longer a voltage in the output circuit of the amplifier 4 and the motor stops.

This effect occurs each time the equilibrium of the bridge is upset due to a variation of the factor to be recorded and therefore the position of the sliding contact 5 is a measure of the instantaneous value of said factor, which may be recorded by mechanically connecting the sliding contact to a recording member.

The arrangement described may also be regarded as a regulator by which the voltage set up between the point 10 and the sliding contact 5 is continuously regulated to a value zero.

The arrangement shown in Fig. 1 has a limitation in that, in the case of the bridge being supplied with alternating current, either a phase-sensitive detector, which supplies different control voltages according to whether the bridge is unbalanced in one sense or in the other, or a phase-sensitive A. C. motor must be used. Furthermore the voltage supply source frequency of 50 cycles per second is often too low, so that it is necessary to employ an oscillator adapted to supply a feed voltage of higher frequency, since in the case of voltage supply at a frequency of 50 cycles per second it is not always feasible to insure a sufficiently rapid adjustment. In this case, the RC-time of the filter for the rectifier to be used is furthermore required to be at least equal to $\frac{1}{50}$ second, preferably more, and sometimes causes instability due to phase shifts even in the case of comparatively low amplification.

The aforementioned difficulties are not experienced in an arrangement wherein the supply voltage is generated in the circuit-arrangement itself. Such an arrangement, which may be employed to regulate a variable factor, for example temperature, is shown in Fig. 2.

Figure 2:
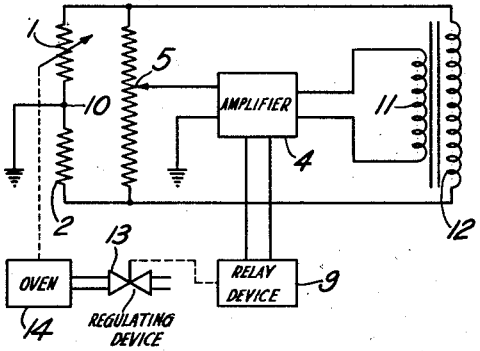

In Fig. 2, the reference numeral 14 denotes, for example, an oven or furnace whose temperature is to be maintained constant. The resistor 1 may have a positive or negative temperature-coefficient and may be provided in or adjacent the furnace 14. A regulating member 13 controls the supply of energy to the furnace and is represented as a valve. The member 13 is operated by a relay device 9. The amplifier 4 is in turn connected to the diagonal of the bridge between the sliding contact 5 and point 10, whilst the output circuit of the amplifier is connected to the primary 11 of a transformer whose secondary 12 is connected to the second diagonal of the bridge.

Hence, the amplifier is fed back across the bridge. When the equilibrium of the bridge is destroyed because the value of the resistor 1 changes in a given sense, the positive feedback will bring about oscillations which operate the relay 9. The frequency of the oscillations is determined by coupling members, for example, tuned circuits with self-inductance and capacity, included in the amplifier. One is not bound to a definite frequency of the oscillations produced, hence it may highly exceed the supply voltage frequency. Oscillations are produced only when the equilibrium of the bridge is upset in the correct sense. If the bridge is unbalanced in a different sense, a negative feedback of the amplifier occurs across the bridge and no oscillations are produced.

Assuming the arrangement to be such that the resistance value of the resistor 1 diminishes at an excessively high temperature of the oven 14, the equilibrium of the bridge is upset and positive feedback occurs from the output circuit to the input circuit of the amplifier 4 across the bridge. Alternatively, the reverse may be true, that is, positive feedback may occur at an excessively low temperature of the oven 14. Due to the generated oscillations, a regulating voltage is produced in the amplifier 4 so that the relay 9 causes interruption or a decrease in the supply of energy to the oven 14. As a result thereof the temperature of the oven 14 will decrease so that the value of the resistor 1 increases again until equilibrium of the bridge is restored and the feedback becomes equal to zero. The oscillations then cease with the result that the supply of energy is again increased and the oven temperature rises. It is evident that if the arrangement is such as to produce positive feedback at an excessively low temperature of the oven, the supply of energy must be increased on the occurrence of oscillations.

With the regulating system of Fig. 2, invariably regular fluctuations of the factor to be controlled occur. Therefore it provides a so-called on and off control.

The circuit-arrangement of Fig. 2 provides within itself the supply voltage for the bridge, but only if it is actually necessary, that is, when the equilibrium of the bridge is upset in a definite direction. One advantage of the arrangement is that no phase-sensitive detector is required. Unless further steps be taken, however, the arrangement cannot be used for recording the factor.

If the factor in a regulating arrangement substantially has the desired value, the condition of self-oscillation is no longer fulfilled, the oscillations cease and regulating voltage is no longer produced. There are three possibilities which permit so-called three-position control, so that fluctuations of a factor to be regulated can be kept much smaller than in the case of on and off control.

The arrangement of Fig. 2, in which feedback occurs only upon a deviation in one direction without having recourse to the invention, may be utilized as a recording arrangement when using the invention. In this case the amplifier 4 is designed in the aforesaid manner. The produced control voltages are now able to operate a motor in one direction or in the other in accordance with the sense of deviation of the factor to be recorded. The motor subsequently re-establishes equilibrium of the bridge in both cases by shifting the contact of the potentiometer incorporated in the bridge.

Figure 3:
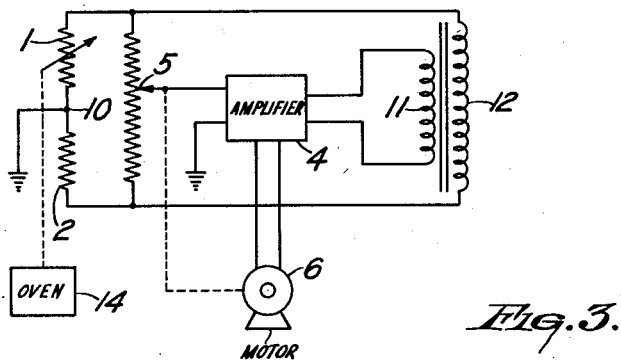

This provides an arrangement as shown in Fig. 3. In this arrangement, for example, the temperature of an oven 14 is recorded. The amplifier 4 permits, in the aforesaid manner, oscillations of two frequencies to be produced from which two different regulating voltages are derived which operate the motor 6 in one direction or in the other. As a result thereof the sliding contact 5 is so shifted as to compensate a variation of the resistor 1, which is due to a variation of the factor to be recorded, thus re-establishing the equilibrium of the bridge. In this case a phase-detector may be dispensed with.

Figure 4:
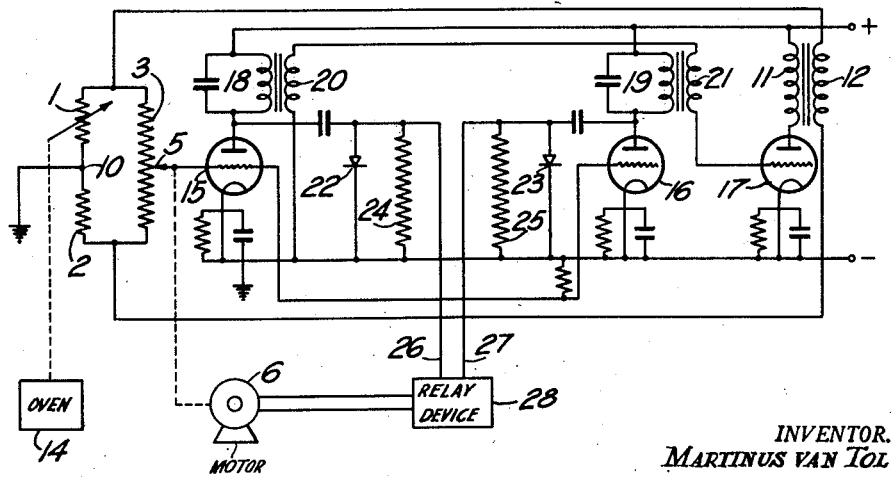

Fig. 4 shows in greater detail a recording arrangement according to the invention. The reference numeral 1 denotes the resistor whose value depends upon a factor to be recorded. The voltage set up between the sliding contact 5 and ground when the equilibrium of the bridge is upset, is supplied to the input circuits of first tubes 15 and 16 of the amplifier. The anode circuit of the tube 15 comprises a circuit 18 which is tuned to a given frequency, and the anode circuit of the second tube 16 comprises a circuit 19 which is tuned to a second frequency. The difference between said two frequencies may be relatively small.

The control grid of a third tube 17 is connected to the cathodes of the tubes through two coupling coils 20 and 21. The coil 20 is coupled to the circuit 18 and the coil 21 is coupled to the circuit 19, both couplings being opposite to each other. The anode of the tube 17 is connected to the positive terminal of the voltage supply source through a primary transformer winding 11. A secondary transformer winding 12 serves to supply the bridge.

When the bridge is in equilibrium no oscillations will be produced in the amplifier, since a feedback voltage cannot be applied to the input of the amplifier. If, however, the resistor 1 varies, due to a variation of the factor to be recorded, so that the bridge is sufficiently unbalanced, a feedback voltage is applied to the input of the amplifier, now acting as an oscillator, and oscillations occur whose frequency depends upon the sense of unbalance. In the case of unbalance in one sense the feedback for one tube is positive and in the case of unbalance in the other sense the feedback for the other tube is positive. Thus, for example, in the case of recording the temperature of an oven, a decrease in temperature will result in the production of oscillations of a frequency $f_1$, whereas oscillations of a different frequency $f_2$ are generated if the temperature increases. By means of rectifiers 22 and 23 and resistors 24 and 25 regulating voltages are derived from said oscillations. This may be effected in such a manner that a regulating voltage is set up at a lead 26 upon unbalance in one sense, whereas a regulating voltage is set up at a lead 27 upon unbalance in the other sense. A device 28 comprising one or more relays causes said regulating voltages to act in opposite sense on the direction of rotation of the motor 6, actuating the sliding contact 5. Alternatively, the motor 6 may operate continuously and relay-operated mechanical couplings may be provided between the motor and the sliding contact 5 which can thus be shifted in both directions in accordance with the sense of the initial variation. The motion of the sliding contact is such as to invariably restore the equilibrium of the bridge.

The arrangement of Fig. 4 may be used for regulating purposes by causing the regulating voltages to act on the energy valve of the oven 14.

The amplifier must, in general, fulfill the condition of providing a considerable amplification for two different frequencies and phase shifts differing by 180° at said frequencies. In this manner, in the case of a deviation in one sense, when the diagonal voltages of the bridge are in phase, the condition of self-oscillation is fulfilled for one frequency and said condition is fulfilled for the second frequency if the diagonal voltages are in anti-phase.

In Fig. 5 the construction of the amplifier is slightly different from that of the arrangement of Fig. 4 according to the invention. The circuits 18 and 19 tuned to the two frequencies $f_1$ and $f_2$ are included in the anode circuit of two pentodes 30 and 31. The tubes 30 and 31 are interconnected through a network comprising a capacitor 33 and a resistor 34. The anode circuit of a third pentode 32 comprises the primary winding 11 of the supply transformer for the bridge, whose secondary 12 supplies the bridge. The center of these windings is grounded. The input terminals C and D are connected to the sliding contact 5 and the common point of the two other bridge resistors. The tubes 31 and 32 are also coupled through a capacitor 35 and a resistor 36.

The coupling members between the tubes produce particular phase shifts. A judicious choice of the component parts of the circuit-arrangement of Fig. 5 permits in this case the deriving of a frequency $f_1$ which is produced upon unbalance of the bridge in one sense and a frequency $f_2$ which is produced upon unbalance in the other sense. This may be explained with reference to Figs. 6a and 6b which show the amplitude curves, and Figs. 7a and 7b which show the phase curves, of the circuits 18 and 19. The curves of the assembly are substantially as shown in Fig. 8, in which $a$ represents the amplitude curve and $b$ the phase curve. At the frequencies $f_1$ and $f_2$ the phase shifts are +90° and —90° respectively. In order to secure the desired effect they should be made 0° and 180° respectively.

This is achieved by means of the coupling elements 33 and 34 and 35 and 36 whose amplitude and phase curves are shown in Fig. 9. Fig. 10 shows the curves of the assembly, the curve $a$ being for the amplitude and the curve $b$ being for the phase.

The phase curve of the assembly of tuned circuits and RC elements is shown in Fig. 11a, where the frequencies at which the phase shifts by 0° and 180° are no longer precisely the tuning frequencies of the circuits 18 and 19. However, since according to the amplitude curve shown in Fig. 11b sufficient amplification occurs, this is not objectionable. In this case the curve $a$ is solely for the tuned circuits, the curve $b$ being for the combination thereof with the RC coupling elements.

The control voltages may again be taken from the anodes of the tubes. In this case it may be desirable to amplify the voltage derived from the circuit 18, since it is not, like the voltage across the circuit 19, amplified in the tube 31.

In practice, it has been found that a choice of the frequencies $f_1$ and $f_2$ of 600 and 750 cycles per second is satisfactory.

It is to be understood that the invention is not limited to the details disclosed but includes all such variations and modifications as fall within the spirit of the invention and the scope of the appended claims.

What is claimed is:

1. A circuit-arrangement for producing control voltages for measuring or regulating a variable factor, comprising an amplifying device including an input circuit and an output circuit, means for applying a feedback voltage from the output circuit to the input circuit of said device to sustain oscillations in said device, the magnitude and phase of said feedback voltage being determined by the deviation from a given value of said factor, and circuit means for producing a phase shift at a given first frequency substantially different from that at a given second frequency, said phase shift and the amplification factor of said device having values at which upon a deviation of said variable factor in one sense oscillations substantially of said first frequency are produced and upon a deviation of said variable factor in the other sense oscillations substantially of said second frequency are produced, and means for deriving said control voltages from the oscillations having said first and second frequencies.

2. A circuit-arrangement as set forth in claim 1, wherein said amplifying device further comprises oscillatory circuits tuned to said first and second frequencies.

3. A circuit-arrangement as set forth in claim 2, wherein said amplifying device still further comprises two amplifying tubes each having an output circuit including a different one of said oscillatory circuits and a coil coupling the respective tube output circuits to the output circuit of said device, said coils being connected to produce said substantially different phase shift.

4. A circuit-arrangement as set forth in claim 2, wherein said amplifying device still further comprises two amplifying tubes each having an output circuit including a different one of said oscillatory circuits, and coupling means connected between said tubes and including a resistor and a capacitor for producing said substantially different phase shift.

5. A circuit-arrangement as set forth in claim 4, wherein said amplifying device further includes a third tube having an output circuit and additional coupling means including a second resistor and a second capacitor connected between said two tubes and said third tube and wherein said means for applying a feedback voltage includes a bridge circuit coupled to the output circuit of said third tube.

6. A circuit-arrangement as set forth in claim 1, wherein said means for applying a feedback voltage comprises a Wheatstone bridge having a variable impedance connected in one branch of said bridge, the value of said impedance being determined by the value of said variable factor, one diagonal of said bridge being connected to said input circuit and the other diagonal being connected to said output circuit.

References Cited in the file of this patent
UNITED STATES PATENTS

| | | |
|---|---|---|
| 2,535,133 | Hoch | Dec. 26, 1950 |
| 2,632,599 | Hornfeck | Mar. 24, 1953 |